United States Patent [19]
Lermuzeaux et al.

[11] Patent Number: 5,621,889
[45] Date of Patent: Apr. 15, 1997

[54] FACILITY FOR DETECTING INTRUDERS AND SUSPECT CALLERS IN A COMPUTER INSTALLATION AND A SECURITY SYSTEM INCLUDING SUCH A FACILITY

[75] Inventors: Jean-Marc Lermuzeaux, St Michel sur Orge; Thierry Emery, St Germain les Arpajon; Patrice Gonthier, Antony, all of France

[73] Assignee: Alcatel Alsthom Compagnie Generale D'Electricite, Paris-Cedex, France

[21] Appl. No.: 257,052

[22] Filed: Jun. 8, 1994

[30] Foreign Application Priority Data

Jun. 9, 1993 [FR] France ................................ 93 06935

[51] Int. Cl.$^6$ ................................................ G06F 11/00
[52] U.S. Cl. ..................... 395/186; 395/183.02; 395/2.82
[58] Field of Search ............................... 395/375, 183.01, 395/183.03, 186, 187.01, 183.02, 183.13, 2.82, 53; 371/15.1

[56] References Cited

U.S. PATENT DOCUMENTS 5,278,901  1/1994  Shien et al. .................................. 380/4
5,448,722  9/1995  Lynne et al. .......................... 395/183.12

FOREIGN PATENT DOCUMENTS

0329415A2  8/1989  European Pat. Off. .

OTHER PUBLICATIONS

Winkler et al "Intrusion and Anomaly Detection in Trusted Systems" Computer Security Applications Conf., 1989, IEEE pp. 39–45.
Lunt et al "Ides: A Progress Report" Computer Securing Applicatiors Conf., 1990 IEEE, pp. 273–285.
Debar et al "A Neural Network Component for an Intrusion Detection System" Security & Privacy, 1992 IEEE Symposium, pp. 240–250.
Ilgun "Ustat: A Real Time Intrusion Detection System for Unix" Security & Privacy, 1993 IEEE Symposium pp. 16–28.
Bauer et al "NIDX—An Expert System for Real Time Network Intrusion Detection" Computer Networking Symposium, 1988 pp. 98–106.
Porras et al "Penetration State Transition Analysis A Role-–Based Intrusion Detection Approach" Computer Security App. Conf. 1992 IEEE pp. 220–229.
S. R. Snapp et al, "A System for Distributed Intrusion Detection", *Digest of Papers Compcon Spring 91–IEEE*, Mar. 1, 1991, pp. 170–176.
T. F. Lunt et al, "A Prototype Real–Time Intrusion–Detection Expert System", *Proceedings 1988 IEEE Symposium on Security and Privacy, IEEE*, Apr.18–21, 1988, pp. 59–66.

*Primary Examiner*—Robert W. Beausoliel, Jr.
*Assistant Examiner*—Joseph E. Palys
*Attorney, Agent, or Firm*—Sughrue, Mion, Zinn, Macpeak & Seas

[57] ABSTRACT

A facility for detecting intrusions and suspect users in a computer installation, and a security system incorporating such a facility that makes use of surveillance data relating to the operation of the installation. The facility includes elements for modelling the computer installation, its users, and their respective behavior with the help of a semantic network; elements for comparing the modellized behavior of the system and of its users relative to modellized normal behavior; elements for interpreting observed anomalies in terms of intrusions and of intrusion hypothesis; elements for interpreting observed intrusion hypotheses and intrusions in order to indicate them and enable restraint actions to be prepared. Elements are provided to evaluate the degree of suspicion of users. The elements co-operate with one another for the purpose of providing information.

17 Claims, 6 Drawing Sheets

FACILITY FOR DETECTING INTRUDERS AND SUSPECT CALLERS IN A COMPUTER INSTALLATION AND A SECURITY SYSTEM INCLUDING SUCH A FACILITY

The invention relates to a facility for detecting intruders and suspect users in a computer installation, and to a security system including such a facility.

BACKGROUND OF THE INVENTION

The security system is designed to protect a computer installation with which it is associated against abnormal computer actions of users (i.e. both insiders who are entitled to use the installation normally and outsiders who must have intruded to use the installation at all), whenever such actions are likely to give rise directly or indirectly to a breach of confidentiality, of integrity, and/or of availability of data and services from the computer installation.

In the context of a security system as mentioned above, the facility is designed to detect such abnormal computer actions that can be considered as constituting intrusions of insiders and a fortiori of intruding outsiders, and also to detect the people implied in such intrusions or suspected of being so implied.

Numerous present-day computer installations, be they provided with centralized processor units or be they organized in networks interconnecting geographically distributed processor units, have various access points for serving their users. The number of such points and the ease with which they are often accessible, requirements necessary for running such computer installations, have the drawback of facilitating attempts at intrusion by people who are not authorized users, and attempts by users of any kind, whether acting alone or in concert, to perform computer operations which such user(s) should not be capable of performing, legitimately.

It is known that detecting intrusions into a computer installation and identifying the users performing illegal actions can be attempted by an approach that is statistical or neural. To this end, each current item of surveillance data which corresponds to a computer action of a subject on an object is compared algorithmically with usual user behavior, which may be represented either by a previously established statistical profile, or by being memorized in a neural network.

That is not completely satisfactory, insofar as the notions of "unusual" behavior and of "intrusive" behavior do not coincide, and in any event it is possible that intrusive behavior may be memorized wrongly, as acceptable normal behavior.

It is also known to make use of an expert system, in particular in association with the preceding method, to attempt to detect intrusions by taking surveillance data supplied by a security system of the computer installation and by applying knowledge thereto relating to potential scenarios for attacking the computer installation. That is not fully satisfactory either, since that method only detects intrusions that correspond to attack scenarios that have previously been stored.

Insofar as each of the approaches briefly outlined above relies on behavior that is limited to elementary actions at operating system level, e.g. reading a file, it is not possible to take account of unacceptable operations that result from complex activity, in particular operations that occur at application level. It is then not possible to draw justified conclusions from the data obtained about the intrusion state of a computer installation that is under surveillance and about the potential or real participation of users in reprehensible operations.

OBJECTS AND SUMMARY OF THE INVENTION

The invention therefore provides a facility for a computer installation for detecting intrusions and possibly suspect users, the facility making use of streams of surveillance data relating to the operation of the computer installation and in particular to the actions of users of said installation, which actions take place at installation level.

According to a characteristic of the invention, the detection facility comprises:

first means for modelling the target as constituted by said computer installation and its users and also their respective behaviors by making use of previously acquired knowledge and rules and by means of a symbolic representation using a semantic network;

second means for comparing the modelled behavior of the installation and its users with normal behavior expected for the same conditions as modelled by the behavior rules and security rules contained in a knowledge base belong to said second means, and for inferring therefrom either an anomaly object in the event of at least one of the behavior rules being violated, or an intrusion object or an intrusion hypothesis object in the event of at least one of the security rules being violated;

third means for interpreting the anomalies observed by implementing the previously acquired rules and knowledge so as to generate, reinforce, or confirm corresponding intrusion hypotheses;

fourth means for correlating and interpreting intrusion hypotheses and intrusions observed by implementing the previously acquired rules and knowledge in order to link together various intrusion hypotheses and/or intrusions, and to infer new intrusion hypotheses and/or intrusions therefrom; and communication means co-operating with the various other means mentioned above for indicating the various data items that said various means produce relating to behavior, anomalies, intrusion hypotheses, and intrusions.

According to an additional characteristic, the detection facility of the invention may include fifth means for using the previously acquired knowledge to identify users who are actually responsible for anomalies, intrusion hypotheses, and intrusions as established by the second, third, and/or fourth means, to evaluate a corresponding degree of suspicion, and to indicate which users are responsible in co-operation with the other means and via the communication means.

BRIEF DESCRIPTION OF THE DRAWINGS

The invention, its characteristics, and its advantages are described in greater detail in the following description which refers to the figures listed below.

MORE DETAILED DESCRIPTION

Figure 1:
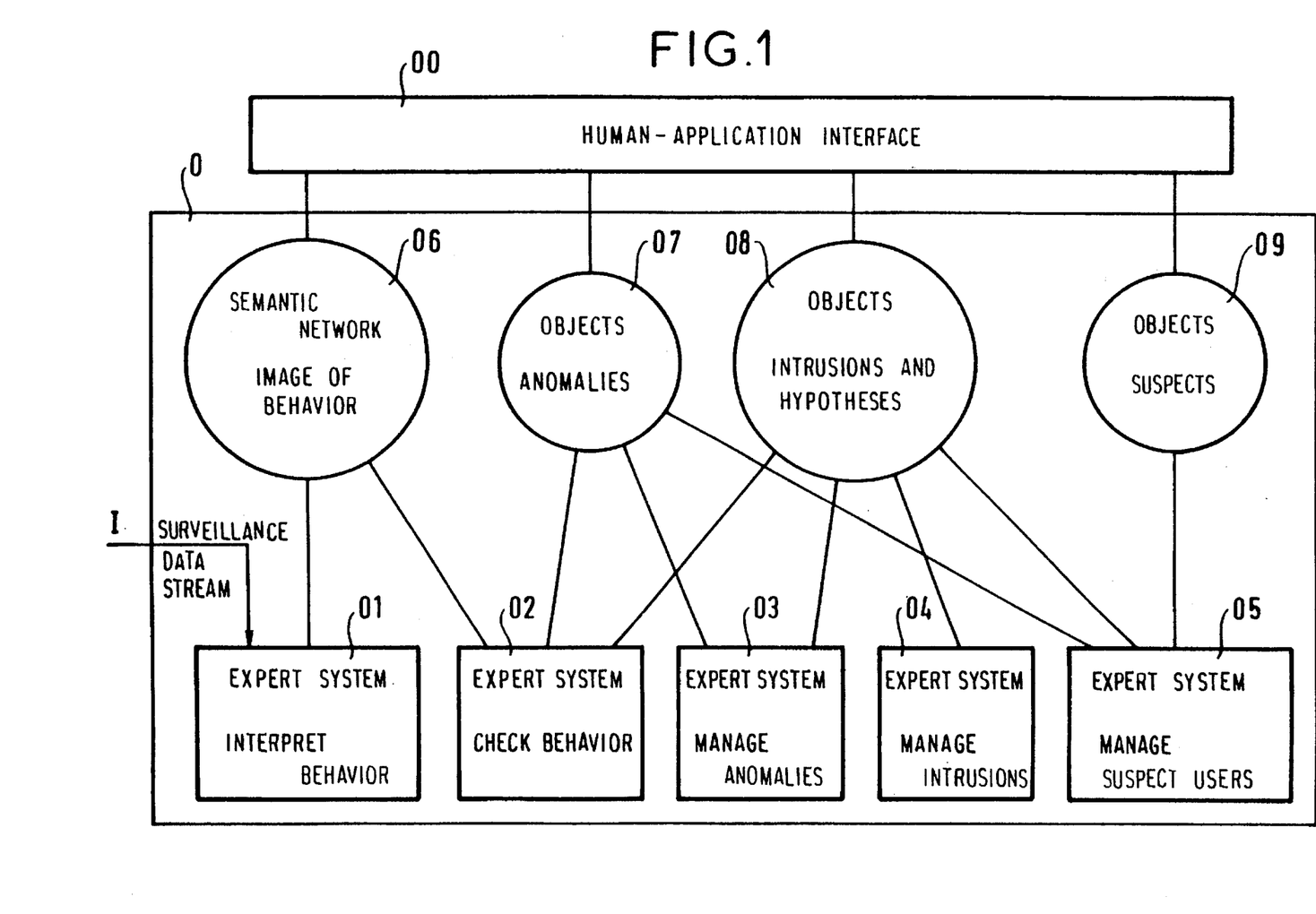
FIG. 1 shows the software architecture of an intrusion detection facility of the invention.

The intrusion detection facility of the invention whose software architecture is shown in FIG. 1 is more particularly designed to be associated with a computer installation in the context of a security system designed to protect said computer installation from intrusions by users (be they ostensibly legitimate insiders or intruding outsiders), said facility being designed to detect not only intrusions and attempted intrusions, but also users likely to be implicated in said intrusions and attempted intrusions.

The software architecture proposed herein provides for implementing five expert systems referenced 01 to 05 which co-operate by means of a blackboard type application referenced 0, and a human-application interface 00 for at least one person having responsibility both for the security of the computer installation and for the operation of the facility for detecting intrusions.

The invention seeks to apply a policy about the computer installation, and in the embodiment under consideration, that policy relates to the security of the installation, and is defined in terms of actions that are permitted or not to users, thus extending the policy beyond the notion of intrusion as defined above. This is done by the detection facility taking account of behavior rules, the breach of which constitutes an anomaly, in addition to security rules the breach of which constitutes, a definite intrusion. Breaches of the rules therefore give rise to anomalies and to intrusions, it being understood that once the facility has operated on an anomaly, it may infer an intrusion. The detection facility is responsible for verifying whether the surveillance data streams it receives in succession (in this case in the form of audit records coming from the computer installation that it serves) are appropriate for considering that the installation is operating normally, as expected. To this end, expert system 01 has an input referenced I via which it receives audit records coming from the computer installation, and it interprets them to extract therefrom a symbolic representation of the state of said computer installation, of its behavior, and of the behavior of its users in the form of a semantic network referenced 06, and at various levels of abstraction, in particular an action level, an activity level, etc.; such a network being constituted in known manner by a set of objects used for modelling purposes and interconnected by relationships for that purpose.

The expert system 02 serves to check the behavior of the computer installation 2 and of its users in such a manner as to determine whether said behavior complies with the behavior and security rules already established.

From the knowledge represented by these rules, it determines whether or not the way behavior is progressing (as represented by a stream of data under examination) corresponds to behavior that is recognized as normal. If not, it generates an intrusion type object, supposing tight security rules have been broken, or an anomaly type object if the behavior is considered as being abnormal, i.e. if the behavior does not comply with the behavior rules, while nevertheless complying with the tighter rules mentioned above.

In this case, an intrusion is considered as constituting clear abuse, e.g. corresponding to a theft of data or to access to the computer installation by a non-authorized user, whereas an anomaly is considered as constituting potential abuse, e.g. a user printing out a volume of data greater than the volume allocated.

The detection facility of the invention is also responsible for managing anomalies in order to generate, reinforce, or confirm hypotheses of intrusion, and to manage intrusions firstly to enable restraining measures to be taken (i.e. security measures for countering intrusions to protect the computer installation), and secondly to attempt to identify the users who may be implicated in an attempt at intrusion, either singly or in collusion.

To this end, the expert system 03 is responsible for interpreting new anomalies on the basis of the anomaly type objects included in the set of objects given reference 07, and linked with the semantic network 06. It uses a knowledge base suitable for interpreting anomalies and it hypothesizes intrusion when uncertain of its interpretation. Under such conditions, it produces objects of an intrusion hypothesis type for incorporating with the intrusion type objects in a set of objects given reference 08, these objects being linked with the semantic network 06.

The reasoning processes of the expert system 03 take account of established rules which are not considered as being totally hard-and-fast, for the purpose of determining whether an observed breach of one or more rules shown up by the presence of one or more anomalies can safely be accepted by the computer installation. Single, reinforced, or confirmed intrusion hypothesis type objects are produced depending on the conditions and on the risks. A confirmed intrusion hypothesis is considered as being a full-blown intrusion.

If several anomalies lead to the same hypothesis, then that hypothesis is reinforced, and provision is made to allocate an ever increasing certainty coefficient to the object representing it, such that when the certainty level exceeds a given high threshold, the intrusion hypothesis is taken as being confirmed and is then taken into account as a definite intrusion.

Expert system 04 is responsible for correlating and interpreting intrusions, on the basis of the intrusion type objects and the intrusion hypothesis type objects incorporated in the set of objects referenced 08, thereby producing new objects of the intrusion type or of the intrusion hypothesis type, and also interconnecting the objects within the set 08. It is thus responsible for taking account of "complex" intrusions, i.e. intrusions that rely on combined attacks that imply collusion between users, or those that happen in cascade and are consequently united by logical or time links.

It is thus suitable for producing intrusion type objects for intrusion hypothesis type objects as already mentioned above, and for specifying the links between them.

The expert system 05 is responsible for managing suspect users on the basis of the objects of the anomaly, intrusion, and intrusion hypothesis types, in order to establish which of the users of the system are actually responsible and are therefore suspected of intrusion so as to give them a corresponding characteristic coefficient referred to herein as a degree of suspicion. Consequently, it defines objects of a suspect type by reasoning on the basis of the above-mentioned objects which it takes into account, and it generates a corresponding set of objects given the reference 09 herein, which objects are linked with the semantic network 06.

In the embodiment envisaged, the expert systems 01 to 05 share a common inference engine that operates with forward chaining, and that is used in connection with as many knowledge bases as there are expert systems.

In known manner, the expert systems 01 to 05 are used herein on the basis of first order production rules, i.e. including variables. Such systems are governed by blackboard type application zero, which enables each of them to communicate with the others concerning the facts it has obtained by reasoning and that it has classified so that all of them can make use of said facts. To each event constituted either by the arrival of a stream of surveillance data in the form of an audit record, or else by the writing of an object, application zero is responsible for then applying the rules that govern it to trigger a working cycle of an expert system that it may optionally have selected out of a plurality of expert systems if more than one of them is suitable for taking the event into account, and that also is known. Thus, in the event of an audit record arriving, priority is normally given to the expert system 01 responsible for interpreting the behavior of the computer installation under surveillance, whereas in the event of an intrusion type object being written, priority is given to the expert system 05 responsible for managing suspect users insofar as a priority objective of the facility of the invention is to warn the person responsible for the security of the computer system of such users and intrusions.

The person or people in charge is/are informed via the human-application interface 00 which gives access to the knowledge stored in the data bases and the fact bases that are mentioned below. This data, as converted by the interface into a human-usable form, is designed to enable restraining measures to be implemented in the computer installation on the basis of an analysis of the situation as shown up by the detection facility and with the aid of the facility in selecting what measures need to be taken, where appropriate. It is essential to inform the person in charge of security about anomalies, intrusion hypotheses, intrusions, users, and suspicions, and access is given to the data stored in the semantic network 06 and the sets of objects 07 to 09 in order to provide data about and understanding of the behavior that may have given rise to the facts concerned.

As already mentioned, the intrusion detection facility described above is assumed to be for incorporation in a security system responsible for protecting the computer installation under surveillance of said facility.

Figure 2:
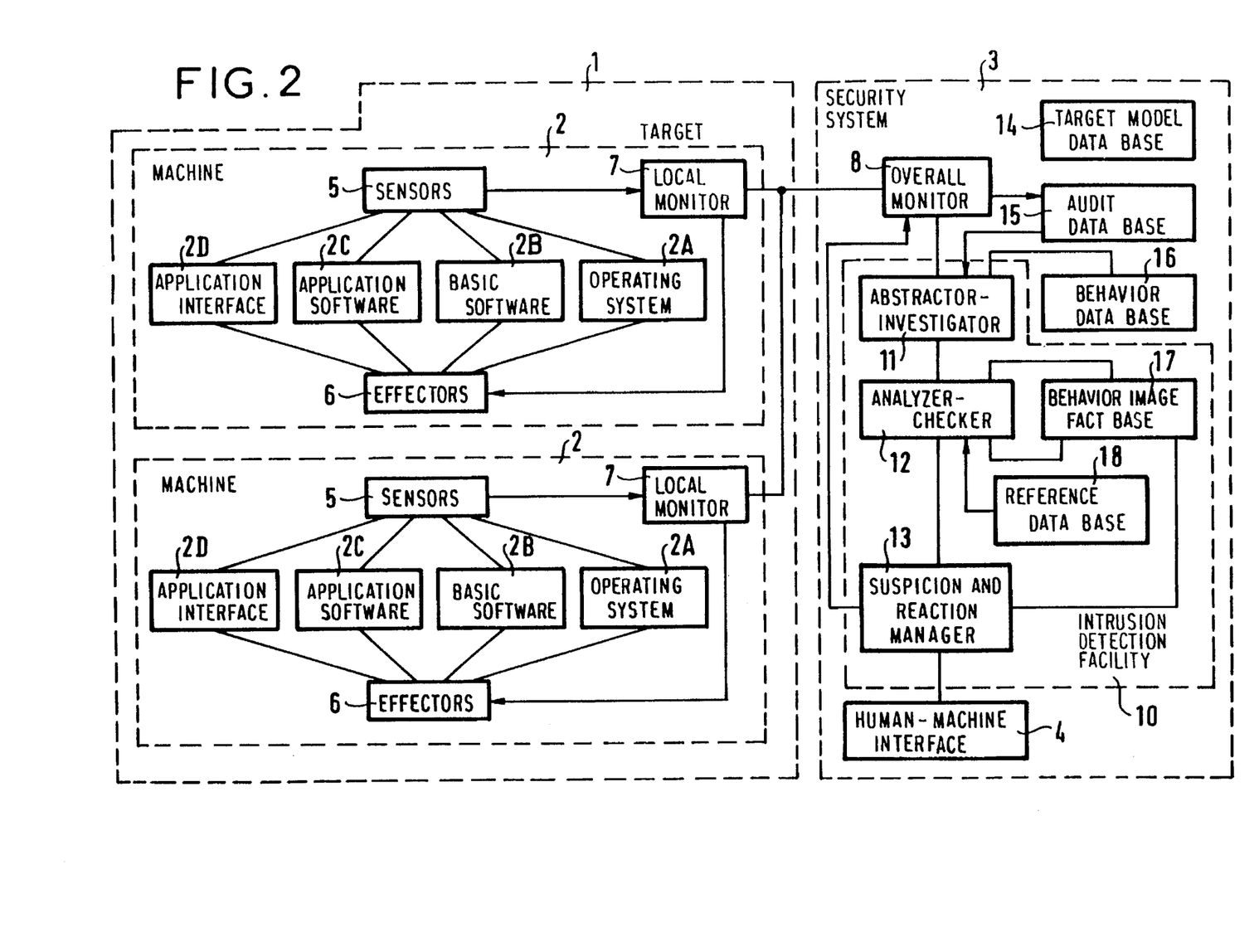
FIG. 2 shows a security system of the invention in association with a computer installation machine with which the system is associated.

Such a security system is shown diagrammatically in FIG. 2 where it is shown in association with a computer installation given reference 1, assumed in this case to be made up of a plurality of machines 2 organized in a network in the embodiment shown, each machine 2 is assumed to include an operating system 2A, basic software 2B, application software 2C, and an application interface 2D, none of which are described in detail herein since their respective structures have no direct bearing on the invention.

As already mentioned, the security system is associated with the computer installation 1 to protect it against abnormal computer actions and more particularly against actions that are suspect or malevolent, as mentioned above.

The security system includes at least one machine 3 or possibly a network of machines, which is suitable for communicating with the machines 2 of the computer installation 1 to protect them against abnormal computer actions of users after performing and causing to be performed operations for the purpose of detecting said abnormal actions and their perpetrators.

The security system also includes at least one human-machine interface 4 giving hardware and/or software access to the machine(s) 3 of the security system in order to enable the security system to be supervised and in order to allow at least one person responsible for the operation of the system to take action, said interface corresponding structurally to the human-application interface 00 mentioned with reference to FIG. 1.

Abnormal computer actions are detected from data supplied by sensors 5 allocated to each machine 2 in the computer installation. The sensors 5 are embedded in the software of the machine 2 to which they are allocated, and in particular in the operating system thereof, given reference 2A herein, in its basic software 2B, in its application software 2C, and in its application interface 2D.

Some of the sensors are designed to indicate actions and events that occur in the elements of the target computer installation in which they are respectively allocated.

Other sensors serve to perform measurements on a cyclical or a one-off basis, e.g. because they have their own programmed timing or else they operate on request.

In the embodiment shown, the data picked up by the various sensors in a machine 2 is converted into the form of an audit record that is time-stamped by the local clock of the machine from which it comes and it is brought together and put into form by a local monitor 7 allocated to the machine 2. The local monitor 7 is connected to an overall monitor 8 in the machine 3 of the security system and it transmits the audit data it has received to the overall monitor. The overall monitor 8 of a machine 3 serves to collect the audit data coming from the local monitors 7 served by the machine 3 and consequently connected thereto. It transmits thereto parameter data and requests and/or commands provided by the machine 3 in which it is included and for the attention of the sensors 4 and the effectors 6 served by the local monitors 7.

The effectors 6 are processes or other agents enabling restraining measures to be implemented for countering attempts at intrusion, they are embedded in the software of the machine 2 to which they are allocated. In the embodiment proposed, such embedding applies to the operation system 2A, to the basic software 2B, to the application software 2C, and to the application interface 2D of the machine 2 in question.

By way of example, the effectors 6 may be processes that have special privileges enabling them to alter the rights or the existence of other processes, or alternatively they are agents that correspond, for example, to fragments of code in the software and capable of affecting the use made of said software.

The restraining measures that they implement include, for example, disconnections, changes in priority or access rights, and the destruction of processes.

As mentioned above, the effectors 6 are invoked by the local monitor 7 of the machine 2 to which they are allocated to implement specific restraining measures ordered by the machine 3 of the security system having the overall monitor 8 with which the local monitor 7 is in communication.

Figure 3:
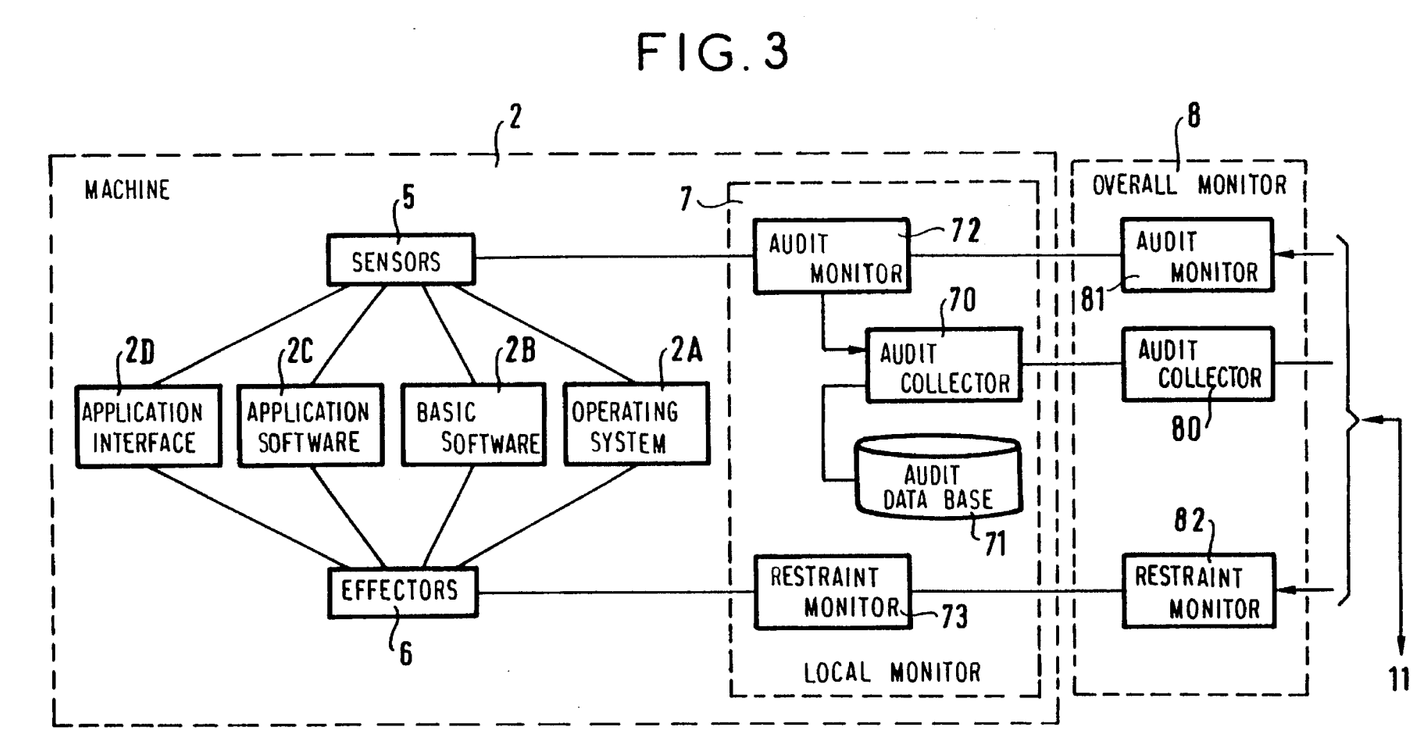
FIG. 3 is a diagram showing the links between a local security system monitor, a computer machine that it serves, and an overall monitor from which it depends.

By way of example, a local monitor 7 may comprise (see FIG. 3):

a local audit collector 70 having a buffer in which audit data from the sensors 5 connected to the local monitor 7 is temporarily received;

an audit data base 71 for storing audit records received by the local collector 70, and in particular those that are not immediately transmitted to the overall monitor 8 with which the local monitor 7 is in communication, e.g. because of filtering established by said overall monitor 8;

an audit monitor 72 for setting the parameters of the sensors 5 connected to the monitor 7 in accordance with commands coming from the above-defined overall monitor 8; and a restraint monitor 73 for controlling the effectors as a function of the specific restraining measures that may be transmitted thereto by the above-defined overall monitor 8 and which are for application in the machine 2 that includes the local monitor 7.

The size and the number of records processed in a single batch are chosen so as to make it possible to restore the correct order of records in the audit stream, the time-stamp of the records, previously based on the clock of the machine 2, being converted in the local monitor into a time-stamp relative to an overall clock for the security system. Local resolution of references is also performed at this level and consists in ensuring that the records are properly labelled, e.g. by process and by user, and also that investigation data properly labelled as provided in response to specific requests from the security system machine 3 which includes the overall monitor to which the records are transmitted. The above-mentioned filtering makes it possible to avoid transmitting records to the overall monitor 8 when the records do not satisfy logic clauses specified by focusing constraints imposed by the machine 3 in which the monitor 8 is included.

In the embodiment shown, the overall monitor 8 of a security system machine 3 makes use of a main audit collector 80 (see FIG. 3) to collect the audit records coming from the machines 2 of the computer installation 1 that are connected thereto, and to archive said records for the purposes of subsequent consultation in a central audit data base 15 (see FIG. 2) of the machine 3 that contains the monitor 8.

This collection is performed, for example, by ordered accumulation in a buffer of the records coming from the local audit collectors 70, where the size of the buffer and the number of records processed in the same batch are selected so as to enable such audit accumulation to take place.

The records are preferably converted into an object-oriented representation common to all of the modules in the security system, other than those which are included in the computer installation 1. Each overall monitor 8 also includes an audit monitor 81 enabling it to send instructions to the local monitors 7 that it serves in order to enable them to calculate the parameter-setting directives for the sensors, to perform local investigations, and to implement filtering at their respective local audit collectors 70, as a function of specified focusing constraints.

The overall monitor 8 also includes a restraint monitor 82 that serves to distribute restraint measures to the local monitors 7 served thereby, which are charged with applying said measures, and with which it communicates.

The overall monitor 8 of a security system machine 3 acts under the control of a detection facility 10 with which it communicates the records after translation into an object-oriented representation as obtained from the audit records provided by the local monitors 7 of the machines 2 in the computer installation 1 that it serves. It receives and transmits to said local monitors 7 the surveillance instructions that are designed to cause the parameters of the sensors to be set and to implement local investigations, to implement instructions for focusing the local filtering of the audit, and instructions relating to restraining measures to be applied by the effectors 6 served by the same local monitors 7.

The detection facility 10 is shown in FIG. 2 as being included within a single machine 3, however it may optionally be distributed over a plurality of machines if necessary. It is structurally implemented by means of components built up by grouping together functions that constitute logical processing ensembles depending on their position and on their level of abstraction. Each component corresponds to a structural unit for implanting in the form of a process or a group of processes that share common data, in the same way as are the sensors, the effectors, and the monitors.

In the embodiment shown in FIG. 2, the detection facility 10 essentially comprises an abstractor-investigator 11, an analyzer-checker 12, and a suspicion and reaction manager 13 which are associated with a plurality of data bases.

The abstractor-investigator 11 corresponds to the behavior interpreting expert system 01 mentioned above, it builds an image of the behavior of the computer installation 1 with which it is associated on the basis of the data supplied thereto.

It combines a plurality of functions for the purpose of providing the data required for analyzing and checking the behavior of the computer installation 1 on the basis of the audit stream transmitted by the overall monitor 8 that is associated therewith.

Figure 4:
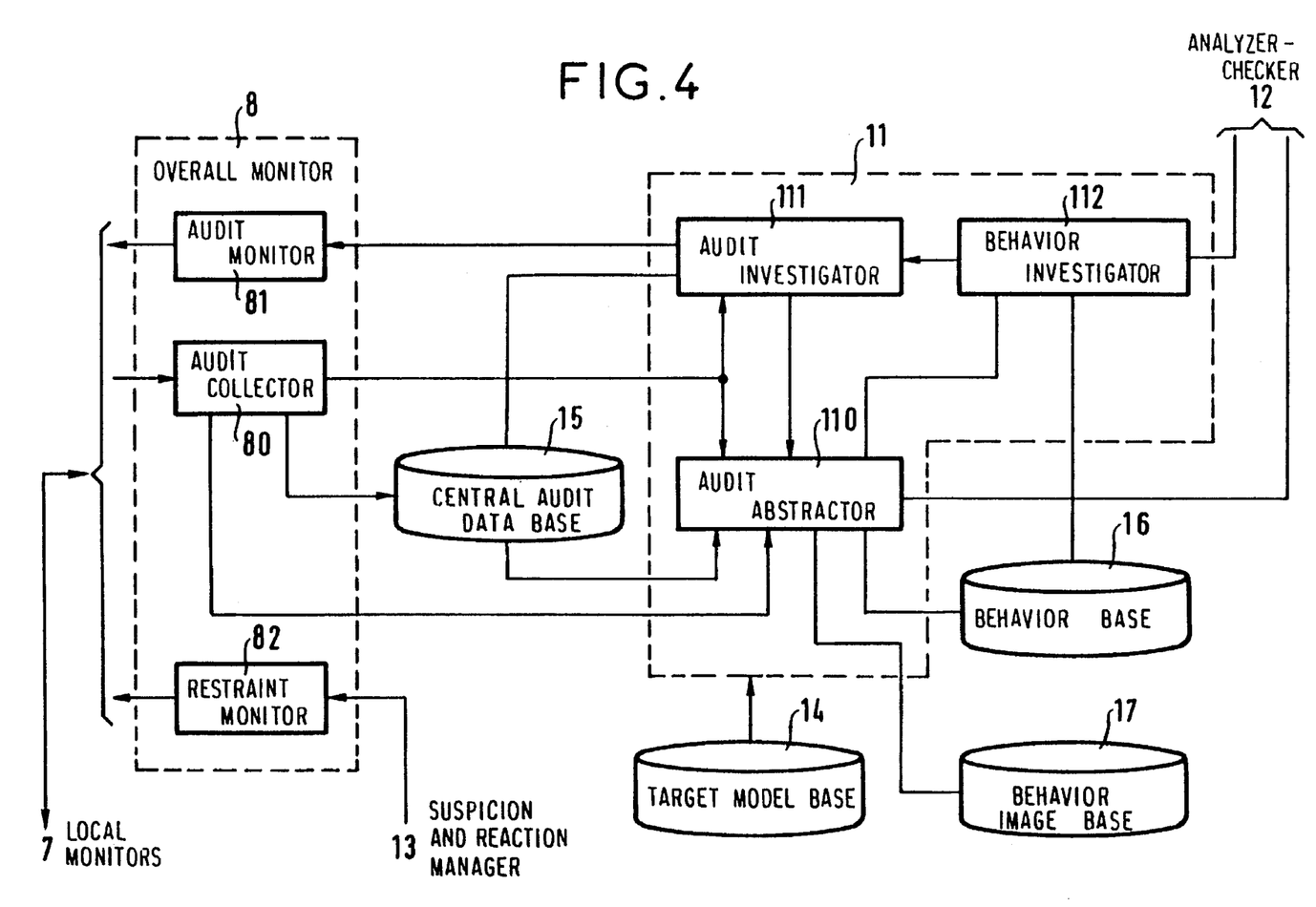
FIG. 4 shows an abstractor-investigator for the detection facility of the invention.

To this end it has an audit abstractor 110, an audit investigator 111, and a behavior investigator 112, as can be seen in FIG. 4.

The audit abstractor 110 correlates and interprets the records, which records represent clues about behavior that need to be combined as a function of semantic constraints so as to be able to infer therefrom data relating to the behavior of entities. The way in which these clues are interpreted relies on a model of the target computer installation 1 and on knowledge specific to the application implemented by said installation.

The abstractor 110 also contextualizes the behavior by interpreting the audit records while making use, where necessary, of context data relating to defined behavior and optionally present in the fact base 17, referred to as the behavior image, or else looked for in the data base 16 referred to as the behavior data base.

The abstractor 110 also serves to focus on behavior by filtering data prior to sending it to the associated analyzer-checker 12 and recording it in the fact base 17, so as to eliminate data that does not comply with logic clauses specified by the focusing constraints relating to behavior.

Finally, the abstractor 110 archives the interpreted behavior data in the behavior data base 16 for later use, in particular by the behavior investigator 112 and by itself.

As mentioned above, the abstractor 110 is controlled by the behavior investigator 112 associated therewith in the same abstractor-investigator, and it is activated either by the audit records it receives from the associated overall monitor 8, or else by the investigation data to be processed coming from the associated audit investigator 111.

In association with the above-defined functions, it serves in practice to perform the following:

interpretation of the audit data, as transmitted by the audit collector 80 of the associated overall monitor 8 in order to create an image in time and in space of the behavior state of the target as constituted by the computer installation 1, in the form of a semantic network in the fact base 17;

interpretation of the investigation data obtained in response to requests from the associated behavior investigator 112; and filtering of behavior data for onward transmission to the analyzer-controller 12 for exploitation purposes and to the behavior image fact base 17 for storage purposes, said filtering being performed as a function of the focusing constraints communicated by the behavior investigator 112.

The image of the computer installation is built up from the above-mentioned stored data together with the data contained in the data base 14 that defines a model of the target as constituted by the computer installation 1, data provided directly by the audit collector 80 of the overall monitor 8 serving the abstractor 110, data stored in a central audit data base 15, and data provided by the associated investigator 111 to the abstractor 110. The results obtained by the abstractor 110 are stored, in particular, in the behavior data base 16 or in the behavior image fact base 17 which is made use of by the abstractor 110 while constructing images.

The audit investigator 111 is controlled by the behavior investigator 112 of the abstractor-investigator 11 included therein, and it performs the following functions:

seeking and controlling the acquisition of special audit data in the central audit data base 15 at the request of the behavior investigator 112 acting on behalf of the associated analyzer-controller 12 or suspicion and reaction manager 13;

transmitting response elements supplied by the audit collector 80 of the overall monitor 8 associated with the behavior investigator 112 via the abstractor 110 to which it is connected; and focusing the audit collectors 70 and 80 that depend therefrom.

The essential role of the behavior investigator 112 is to search for the data desired by the analyzer-checker 12 and by the suspicion and reaction manager 13 within the behavior data base 16 and to control the acquisition thereof by sending behavior investigation requests to the audit investigator 111 with which it is connected, or the processing thereof by sending focusing constraints to the abstractor 110 to which it is also connected.

To this end, the behavior investigator 112 aggravates the behavior investigation requests it receives in order to see whether they complement one another or cross-check one another and can consequently be grouped together for factorizing processing thereof.

The behavior investigator 112 searches in the behavior data base 16 by building requests so as to obtain responses to the investigation requests and to request audit level searches in the event of a request not being satisfied.

When the desired data is not stored in the behavior data base 16, the behavier investigator 112 asks for it to be searched for by the audit investigator 111 with which it is connected so that the audit investigator can find the data in its central audit data base 15. The audit records found are then interpreted by the abstractor 110 to build up behavior data constituting the results of the investigation. These results are then transmitted to the behavior investigator 112 for forwarding to their destination.

The behavior investigator 112 is also suitable for calculating new focusing of the abstractor 110 and for causing new focusing and audit checking on instructions to be calculated by the audit investigator 111, on request of the analyzer-checker 12 for forthcoming data.

Figure 5:
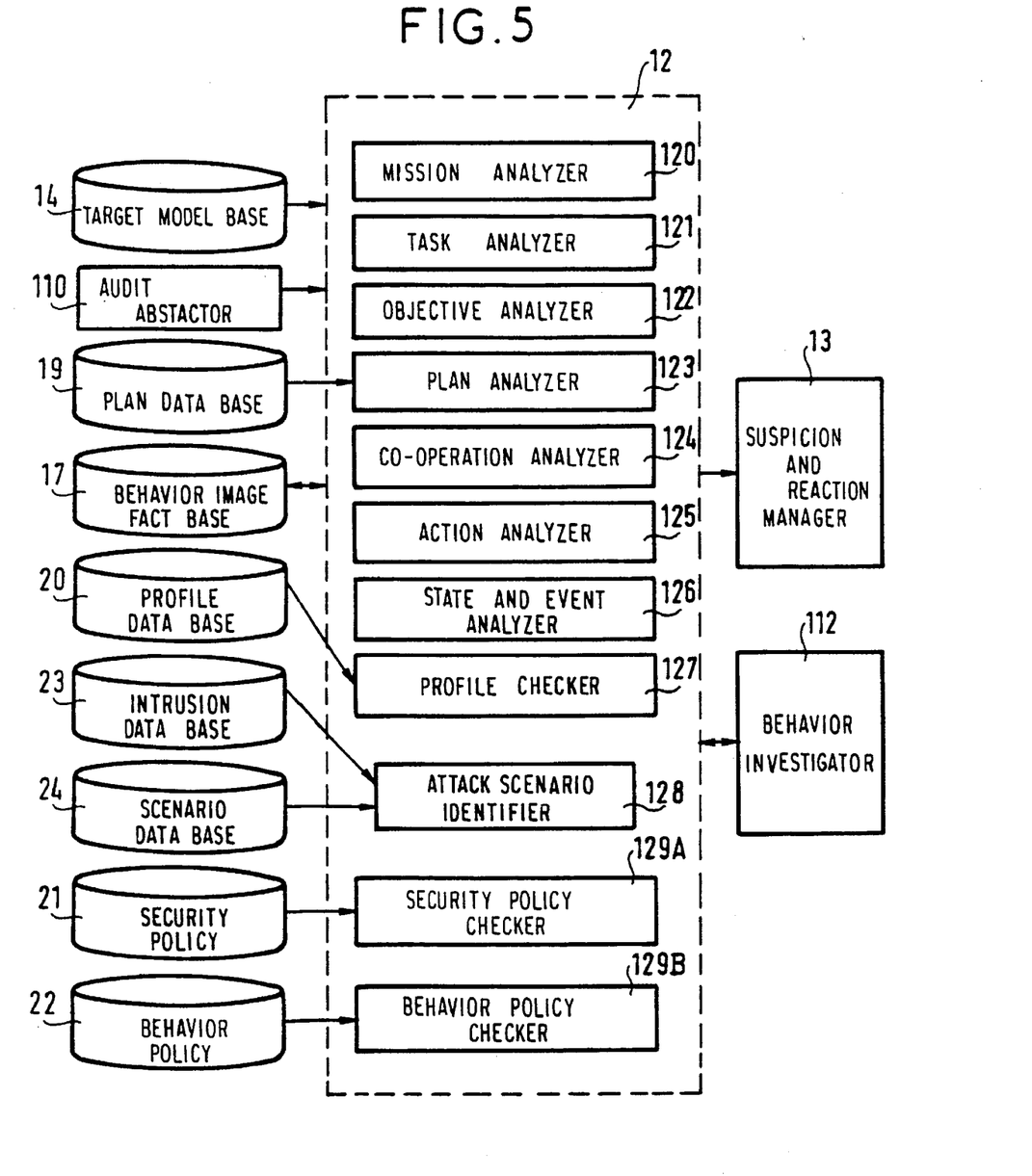
FIG. 5 is a diagram of an analyzer-checker for a security system of the invention.

The analyzer-checker 12 of the detection facility of the invention is preferably made up of a plurality of modules designed to enable the behavior of the computer installation 1 to be analyzed and checked by reasoning on the basis of the behavior image that has been built up in order to detect anomalies and intrusions that are liable to affect the security of the installation.

The behavior analysis functions make use of the model that has been built up of the computer installation and of knowledge it possesses about the domain in order to infer behavior at other levels and to verify that behavior at different levels is in correspondence. These functions can be split up into cognitive analysis of user behavior and operational behavior analysis of the computer installation, i.e. of the actions, states, and events that take place within said installation.

In the embodiment shown, cognitive analysis of user behavior comprises analyzing the missions of said users, their tasks, their objectives, their plans, and the ways in which they co-operate, with such analyses being performed on the basis of corresponding specialized modules referenced 120 to 124 in FIG. 5 which shows the analyzer-checker 12.

The mission analyzer referenced 120 is defined to verify that the tasks which are current for a user under consideration in the computer installation 1 correspond to the missions specified by the roles specific to that user and to infer new missions on the basis of tasks not taken into account by the current missions.

To this end, it makes use in particular of the target model data base 14, and of the behavior image fact base 17, and it co-operates with the behavior investigator 112 and with various other modules of the analyzer-checker 12, such as a task analyzer module 121 and a co-operation analyzer module 124. More particularly, it informs the suspicion and reaction manager 13.

Current tasks that are not recognized by the task analyzer module 121 are confronted with the task specifications listed by the missions allocated to the user and by the roles that said user performs, with verification by comparison with a model (also known as "pattern matching") being implemented for this purpose, for example. When tasks that do not correspond to any mission are observed, they are indicated to the co-operation analyzer and/or to a module for managing anomalies in the suspicion and reaction manager 13.

The task analyzer 121, which is at a lower level of abstraction that the preceding, is responsible for verifying whether or not the new objectives inferred for the users come within their current tasks and whether new tasks have not been started while the objectives of said tasks remained unexplained.

To this end it uses the target model data base 14, and the behavior image fact base 17, and it co-operates with the mission analyzer 120 with an objective analyzer module 122 and with the behavior investigator 112; and more particularly it informs the suspicion and reaction manager 13.

Comparison with a model, of the same type as that mentioned above, serves to determine whether the current objectives for a user as recognized by the objective analyzer 122 correspond to the specifications of objectives given by the previously recognized tasks, or stemming from the missions allocated to that user. Objectives that do not correspond to any recognized task are optionally abstracted or sent to the co-operation analyzer 124 or to the suspicion and reaction manager 13, depending on circumstances.

The objective analyzer 122 is designed to draw on the actions, the general activities, and the recognized plans for a user in such a manner as to infer the user's objectives, and it also evaluates the extent to which current objectives are satisifed by the plans implemented.

It makes use of the target model data base 14, and of the behavior image fact base 17, and it co-operates with the task analyzer 121, a plan analyzer module 123, the co-operation analyzer 124, and the behavior investigator 112; more particularly it informs the suspicion and reaction manager 13.

To this end, it compares the current plans that have been recognized by the plan analyzer 123 with those that are listed in the current or expected objectives of a user under consideration. Plans or actions that do not correspond to any modellized objective are abstracted, sent to the co-operation analyzer 124, or indicated as being anomalies to the suspicion and reaction manager 13.

The plan analyzer 123 is designed to recognize plans performed by users on the basis of their present or previous actions, on the basis of the current plans and of the inferred objectives. It makes it possible to isolate actions that do not correspond to the current plans and that may require more thorough analysis.

It makes use of the target model data base 14, of the behavior image fact base 17, and of the plan data base 19. It co-operates with the objective analyzer 122, the abstractor 110, the co-operation analyzer 124, and the behavior investigator 112. More particularly, it informs the suspicion and reaction manager 13.

Insofar as each new action undertaken by a user may be in application of a current plan, may constitute the start of a new plan, or may be an isolated action, it is connected, for example via graphs, to earlier actions that have not yet been forgotten in order to perform the plan recognition operation; each graph then represents the occurrence of a plan of which the action is likely to form a part. An action is considered under these circumstances as having been "forgotten" as the term is used above once the plan from which it depends has been terminated and validated. Unexplained actions are likely to be sent to the co-operation analyzer 124 or to be indicated as anomalies.

The graphs representing candidates resulting from plan recognition are evaluated, as mentioned above, so that only the most plausible are taken into account, with heuristics being employed for limitation purposes, such as giving preference to hypothesis that correspond to a current or an expected objective being satisfied. Where justified, these evaluations may give rise to an anomaly being indicated.

The co-operation analyzer 124 is designed to recognize the occurrence of co-operation whether specified or not in the model of the computer installation 1, on the basis of actions, plans, or tasks that are unexplained by an analysis of plans, tasks, and missions. When non-specified co-operation is recognized that does not correspond to the structure of the organization or of the application, then an anomaly must be indicated.

The target model data base 14 and the behavior image fact base 17 are used by the mission, task, and plan analyzers 120, 121, and 123. The abstractor 110 and the behavior investigator 112 co-operate with the co-operation analyzer 124 which acts more particularly to inform the suspicion and reaction manager 13.

Potential modes of co-operation between users, as specified by organization modelling included in the target model, are scanned in order to detect occurrences thereof. The model of the computer installation 1 and the expert knowledge relating to the application domain are used for recognizing possible co-operation of a user with at least one other that could explain the actions, plans, objectives, or tasks that would otherwise remain unexplained.

Analysis of the operational behavior of the computer installation 1 which is performed in addition to the cognitive analysis mentioned above, in this case comprises an analysis both of active behavior and of passive behavior within the installation, active behavior being defined in terms of action, and passive behavior in terms of events or states. This analysis of operational behavior is implemented by means of specialized modules referenced 125 and 126 in FIG. 5. The action analysis performed by an analyzer module 125 is designed to ensure detection of abnormal ways of performing operations in the computer installation 1. It is done by checking that the effects of actions conform with the specifications for the operations, by verifying the repercussions of actions on the underlying layers, with any non-satisfactory action being indicated as an anomaly.

The action analyzer module 125 makes use, in particular, of the target model data base 14 and of the behavior image fact base 17. It co-operates with the abstractor 110 and with the behavior investigator 112, and, more particularly, it informs the suspicion and reaction manager 13.

Actions are analyzed by protocol checking, with the receivers and the parameters implemented by actions being analyzed with reference to the models of operations that have been executed. It is also performed by checking effects, with the states and events that follow the actions being compared with the specification for the effects of operations that have been executed. It is also done by checking repercussions, with possible secondary actions at the same level or in an underlying level that constitute the repercussions of primary actions themselves being evaluated with reference to the specifications of the effects of operations that have been executed.

The analysis of states and events as performed by an analyzer module 126 is intended to detect abnormal states and events in the computer installation 1, where states and events are considered as being abnormal if they do not correspond to their causes or to their specifications and if they are incoherent relative to one another or relative to the actions that have been performed on the entities.

For this purpose, state and event analyzer 126 makes use of the target model data base 14 and of the behavior image fact base 17. It co-operates with the abstractor 110 and with the behavior investigator 112. More particularly, it informs the suspicion and reaction manager 13.

Protocol is checked by analyzing states and also parameters and characteristics of events relative to the model of the events and of the computer installation 1. A coherence check is also performed. It verifies correspondence firstly between the secondary states and events following the states and events under analysis and secondly the actions and the histories of the entities which constitute the agents, processes, and objects of the computer installation 1.

The behavior checking functions incorporated in the analyzer-checker 12 are performed in this case by a plurality of modules referenced 127, 128, 129A, and 129B in FIG. 5.

These checking functions are designed to verify that the behavior of the computer installation 1 complies, in this case, with three corresponding references that are respectively classified as relating to past history, operations, and intrusions. Each of them contains respective profiles, expressions of behavior security policy, and historical records of attack scenarios and of intrusion descriptions. The purpose of the checking functions is to verify that the behavior determined by observation complies with the profiles, and that it satisfies the established behavior and security policies. The functions must also detect possible implementations of attack scenarios. Compliance of the behavior determined by observation relative to archived profiles is verified by a "profile checker" module 127. The profiles associated with entities specify their usual behavior and those defined for classes and groups of entities are considered as being references of standard or typical behavior. A correspondence test that is symbolic or numerical and mainly statistical is performed to check the profile of an entity. The measurements corresponding to its characteristics are performed on the behavior and they are compared with the values recorded in the archived profile. Overall conformity with the archived profile is evaluated, for example, on the basis of correspondences for individual measurements, with an anomaly being indicated if conformity is considered as being poor.

To this end, the profile checker 127 uses the target model data base 14 and the behavior image fact base 17, together with a profile data base 20. It co-operates with the abstractor 110 and with the behavior investigator 112. More particularly, it informs the suspicion and reaction manager 13.

An action may give rise to verification of the profile of the actor (user or agent), of the action, and of the receivers (agents or objects) subjected to the action.

An event, a state, or any other behavior data is also capable of causing the profiles of the units concerned to be verified.

For measuring characteristics, the argument on which the characteristics are based are evaluated and the measurement methods are applied to them, which methods are defined by classes represented by measurement types. Requests made by the behavior investigator 112 enable possibly missing data to be obtained.

To verify that profiles are complied with, the determined characteristics are compared, e.g. by a statistical test or by symbolic correspondence, with the corresponding values of the profile, and overall conformity is estimated on the basis of the respective matches of the various characteristics. Differences are considered as being representative of behavior that is unusual or atypical and that corresponds to an anomaly.

Policy checking is performed by a module 129A for security and by a module 129B for behavior, said modules verifying the rules laid down against the observed and inferred behavior of the computer installation 1 and of its users, where the rules may be expressed, for example, in the form of constraints in logic clauses or as production rules.

The security policy checking module 129A verifies that security policy is complied with both with respect to active behavior and with respect to passive behavior, and in this case it is activated by the abstractor 110 or by updating the behavior image. It makes use of the target model data base 14, of the behavior image fact base 17, and of a security policy data base 21, and it co-operates with the abstractor 110 and with the behavior investigator 112. It is suitable for sending requests to the behavior investigator, when necessary, and it serves more particularly to inform the suspicion and reaction manager 13.

As already mentioned, behavior that does not comply with the security policy rules is considered as being an intrusion and is consequently indicated to the suspicion and reaction manager 13, and naturally also to the person in charge of security, either directly or else via the manager.

The module for checking behavior policy 129B verifies that behavior policy is complied with, and it likewise is activated by the abstractor 110 or by updating the behavior image. It makes use of the target model data base 14, of the behavior image fact base 17, and of a behavior policy data base 22, and it co-operates with the abstractor 110 and with the behavior investigator 112. It is suitable for sending requests to the behavior investigator, if necessary, and more particularly it informs the suspicion and reaction manager 13.

Failure to comply with the behavior policy rules is considered as indicating an anomaly or an intrusion as the case may be and it is consequently indicated to the suspicion and reaction manager 13 and also to the person in charge of security via said manager, should that be necessary.

Detecting possible implementation of already-known attack scenarios is performed by means of an identifier module 128. It relies on taking account of the actions, states, and events that are implied in an execution. An attack scenario defined for a given intrusion can be recognized if the behavior of the entities and of the computer installation corresponds to the specifications included in the scenario. Verification that the actions specified by a scenario are indeed being performed and modification of the states and/or events to which they lead can therefore be done. A partial match already constitutes an anomaly which may be transformed into an intrusion if the level of matching reaches a predetermined certainty threshold.

To this end, the identifier module 128 uses the target model data base 14, the behavior image fact base 17, and an intrusion data base 23 and an attack scenario data base 24, and it co-operates with the abstractor 110, with the behavior investigator 112, and with the suspicion and reaction manager 13 which it keeps informed.

It is guided by data, e.g. on the occurrence of new actions or new events. A new action of an actor, a new state, or a new event may form part of a current attack scenario, may trigger a new attack scenario, or may be an element of isolated behavior, and it must therefore be confronted with the scenarios currently under examination and with the beginnings of known scenarios. It is assumed herein that each scenario possibility is represented by a graph linking together the corresponding behavior elements. Graphs that may be recognized as being implied in a scenario are evaluated to select the most plausible graphs, with heuristics being used, for example, to delimit them. The degree of matching with a known attack scenario makes it possible to determine whether the action suffices to infer an anomaly or an intrusion. Suspected intrusions may optionally give rise to planning and the attack scenario data base 24 is then added to by new attack scenarios that have been obtained.

Figure 6:
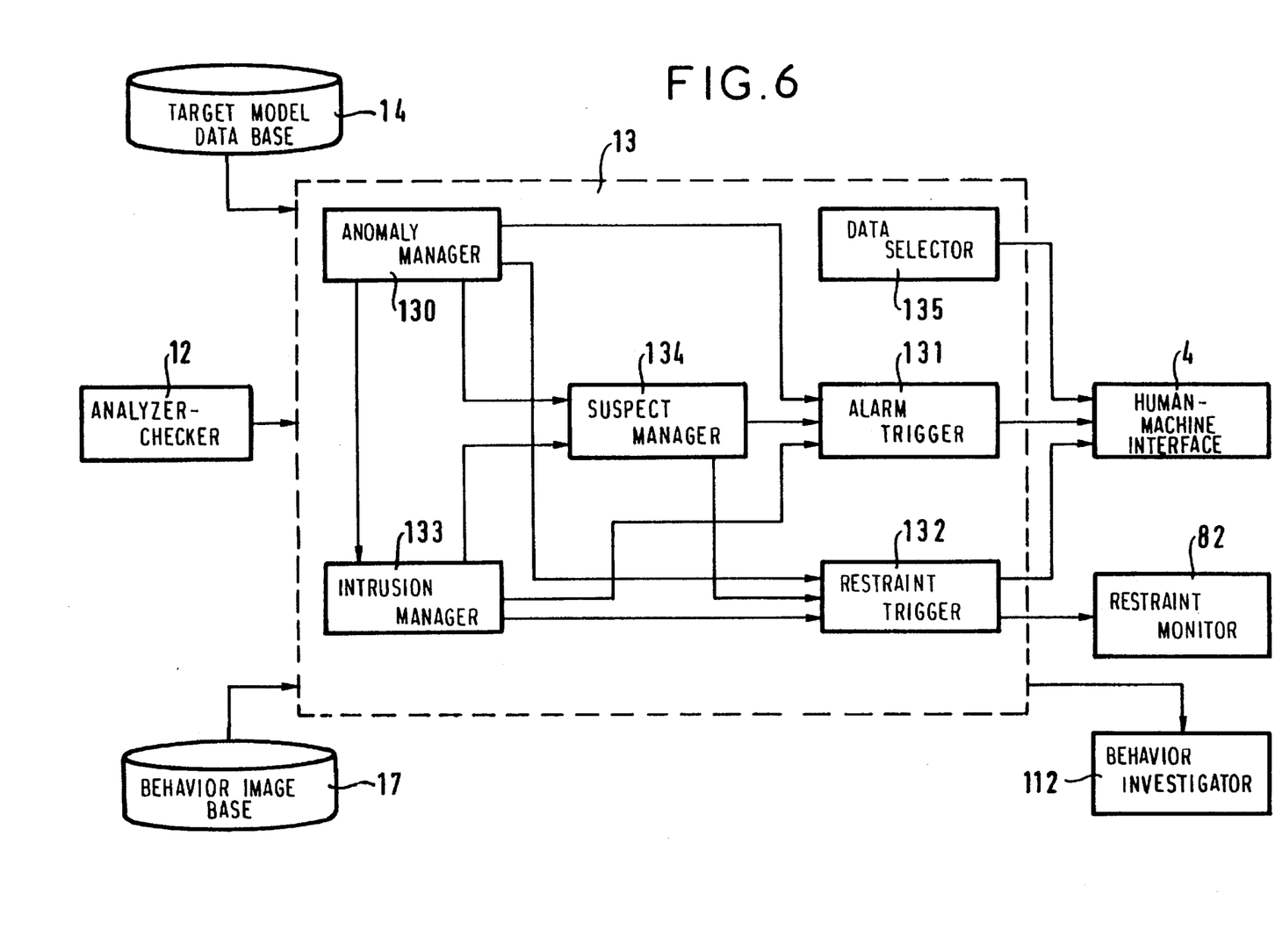
FIG. 6 is a diagram of a suspicion and reaction manager for a security system of the invention.

The suspicion and reaction manager 13 of the detection facility of the invention is generally intended to serve as an intermediary between the analyzer-checker 12 and firstly the computer installation 1, and secondly the person responsible for security with whom communication takes place via the human-machine interface 4. It is designed to enable anomalies and intrusions that have been indicated by the analyzer-checker 12 to be interpreted, to evaluate the degree of suspicion of users, and to assist in triggering the necessary restraining measures, under the supervision of the person in charge of security who is assisted by the manager 13.

In this case, the suspicion and reaction manager 13 includes a plurality of modules referenced 130 to 135, with a first such module referenced 130 being an anomaly manager responsible for processing anomalies indicated by the analyzer-checker 12. Amongst such anomalies it identifies those which require alarms to be triggered or which require intrusion restraining measures to be implemented, and it infers intrusions or intrusion hypotheses.

The anomaly manager 130 co-operates with the various analyzers 120 to 127 and the controllers 127 and 129B of the analyzer-checker 12, and it makes use of the target model data base 14 and the behavior image fact base 17. It feeds alarm triggers 131 and a restraint trigger 132, intrusion managers 133, and suspect managers 134, and the behavior image fact base 17.

To interpret anomalies, the knowledge base of the anomaly manager expresses heuristics that enable certain anomalies to be classified as symptoms of intrusion. Intrusion hypotheses lead to additional anomalies being looked for in the behavior image. Intrusions and intrusion hypotheses are indicated to the intrusion manager 133.

To convey other anomalies, the knowledge base expresses anomaly indicative criteria to the suspect manager 134, to the alarm trigger 131, and to the restraint trigger 132.

The intrusion manager 133 is responsible for interpreting intrusions and intrusion hypotheses for verifying whether wider-ranging intrusion is not taking place and/or whether consecutive intrusions are not taking place. It is capable of being activated by the mission analyzers 120, the task analyzers 121, and the objective analyzers 122, by the attack scenario identifier 128, by the policy checkers 129A and 129B, and by the anomaly manager 130. It communicates with the target model data base 14, the alarm trigger 131 and the restraint trigger 132, the suspect manager 134, and the behavior image fact base 17.

The knowledge expressed by the knowledge base of the intrusion manager is used to link intrusions together, to infer new intrusions therefrom, and to interpret intrusions as possible component parts of wider-ranging intrusions. Higher level intrusion hypotheses cause additional data to be looked for in the behavior image.

Intrusions structured in this way are indicated to the suspect manager 134. The knowledge base also expresses criteria for indicating intrusions and intrusion hypotheses to the alarm trigger 131 and to the restraint trigger 132 as already mentioned.

The suspect manager 34 is responsible for identifying the users who are actually responsible for anomalies, for intrusion hypothesis, and for intrusions. It evaluates the degree of suspicion to be given to them. It also serves to identify users for whom it is necessary to trigger alarms or to be able to implement restraint measures.

The suspect manager 134 is capable in this case of being activated by the anomaly manager 130 and by the intrusion manager 133, it communicates with the target model data base 14 and with the behavior image fact base 17, and it feeds the alarm trigger 131 and the restraint trigger 132.

Interpreting anomalies and intrusions when co-operation is taking place that may be indicative of direct co-operation or collusion is performed by the knowledge base while it is looking for the users that are responsible. Degrees of suspicion are generated by the anomalies, the intrusion hypotheses, or the intrusions for which a user or a computer agent are responsible, and they are combined to enable an overall level of suspicion to be deduced for the user in question.

Suspect users are indicated to the alarm trigger 131 and to the restraint trigger 132.

The alarm trigger 131 is responsible for indicating anomalies, intrusion hypotheses, intrusions, and suspect users determined by the anomaly manager 130, the intrusion manager 133, and the suspect manager 134 to the person in charge of security. It makes decisions on the basis of knowledge criteria stored in the target model data base 14 and as a consequent thereof it generates alarms which are transmitted to the human-machine interface 4 for showing to the person in charge of security, said alarms being associated with their contexts, as read from the behavior image fact base 17.

The restraint trigger 132 is responsible for suggesting restraint measures to the person in charge of security for countering the suspect anomalies, intrusions, and users as indicated by the above-mentioned managers 130, 133, and 134. Restraint measures are decided on and generated by applying criteria stored in the target model data base 14 to the data coming from the anomaly manager, the intrusion manager, and the suspect manager. The measures suggested to the person in charge of security via the human-machine interface 4 are thus associated with context taken from the behavior image fact base 17.

The data selector 135 is responsible for indicating events, actions, and data relating to the behavior of the computer installation 1 and that may be of interest to the person in charge of security.

It may be activated by the analyzer-checker modules 12 and by updating when performed on the behavior image fact base 17. To this end, it communicates with the target model data base 14 and with the behavior investigator 112. The data transmitted by the selector 135 for the purpose of indicating events, actions, or data about the behavior of the computer installation 1 is obtained by sorts performed on the behavior data conferred by the analyzer-checker modules 12 and obtained in the behavior image fact base 17, on application of criteria defined in its knowledge base. The behavior investigator 112 enables the person in charge of security to make requests to obtain further data from the data selector 135, depending on requirements.

What is claimed is:

1. A facility for detecting at least one of intrusions and suspect users, in a computer installation, making use of surveillance data streams relating to the behavior of the computer installation in operation and to the actions of the users of said installation, said data streams being generated in the installation, the facility comprising:

a first system which models, based on said computer installation and its users and their respective behaviors, a target as a symbolic representation using a semantic network, by employing previously acquired knowledge and rules;

a second system which compares said target with normal behavior expected for the same conditions as modelled by behavior rules and security rules contained in a knowledge data base of said second system, and which infers therefrom either an anomaly object in the event that at least one of the behavior rules is violated, or an intrusion object or an intrusion hypothesis object in the event that at least one of the security rules is violated;

a third system which interprets the anomaly and intrusion objects by implementing said previously acquired rules and knowledge used by said first system so as to generate, reinforce, or confirm a corresponding intrusion hypotheses;

a fourth system which correlates and compares said intrusion hypotheses and intrusions by implementing said previously acquired rules and knowledge used by said first system in order to relate various intrusion hypotheses and/or intrusions, and to infer new intrusion hypotheses and/or intrusions therefrom;

a communication system which cooperates with the first through fourth systems to provide the various data items that said first through fourth systems produce relating to behavior, anomalies, intrusion hypotheses, and intrusions;

an abstract-investigator which constructs an image representing behavior of said target modeled by said first system and performs investigations in data bases and a fact base of the facility and also in the computer installation;

an analyzer-checker, coupled to said abstract-investigator, which receives image data representing said image from said abstract-investigator, analyzes said data to interpret behavior of the computer installation and its users with reference to said target to detect anomalies, and outputs anomaly data indicative thereof; and a suspicion and reaction manager, coupled to said analyzer-checker, which analyzes said anomaly data, received from said analyzer-checker, to interpret the detected anomalies and intrusions, identify the users actually responsible for anomalies and intrusions, attribute a degree of suspicion to at least one of said users so as to trigger corresponding messages for transmission via a human-machine interface, and optionally trigger restraint measures applicable to the computer installation via said human-machine interface.

2. A facility as claimed in claim 1, further comprising a fifth system which uses said previously acquired knowledge to identify users who are actually responsible for anomalies, intrusion hypotheses, and intrusions as established by the second, third, and/or fourth systems, to evaluate a corresponding degree of suspicion, and to indicate, in co-operation with the first through fourth systems and via the communication system, which users are responsible.

3. A facility as claimed in claim 1, wherein said first through fourth systems are each are constituted by expert systems that share a common inference engine, operating with forward chaining, said engine being used in association with as many knowledge bases as there are expert systems.

4. A facility as claimed in claim 1, wherein said abstractor-investigator comprises:

an audit abstractor responsible for creating a time and space image of a state and behavior of said target modelled by said first system and interprets on demand data that results from investigation of said state and behavior of said target;

an audit investigator which searches data in a central audit data base of the facility and acquires surveillance data on demand about the computer installation; and a behavior investigator which searches for data for the analyzer-checker and for the suspicion and reaction manager in the data and fact bases of the facility in association with the audit investigator which it controls.

5. A facility as claimed in claim 1, further comprising an analyzer-checker which associates a plurality of modules for analyzing the behavior of said target with a plurality of modules for checking the behavior of said target.

6. A facility as claimed in claim 5, wherein the analyzer modules comprises modules that perform cognitive analysis on the behavior of users, and modules that perform analysis of the operational behavior of the computer installation.

7. A facility as claimed in claim 5, wherein the modules for analyzing behavior comprise a profile checker responsible for checking compliance of behavior as determined by observation with an archived profile, an attack identifier responsible for looking for similarity between determined behavior and known attack scenarios, and two policy checkers, one being a security checker suitable for determining failure to comply with security rules stored in a security policy data base in order to trigger indicating of an intrusion to the suspicion and reaction manager in the event of non-compliance, and the other one being a behavior policy checker suitable for determining non-compliance with behavior rules stored in a behavior policy data base in order to trigger, as appropriate, the indication of an anomaly or of an intrusion to the suspicion and reaction manager.

8. A facility as claimed in claim 1, wherein the suspicion and reaction manager includes a device which interprets the indicated anomalies and intrusions, a device which determines users suspected of being implied in the anomalies, intrusion hypotheses, and intrusions, and also determines a suspicion level which is consequently applied to said suspects, and a device which triggers alarm procedures and prepares restraint measures for access by a person in charge of security via the human-machine interface of the facility.

9. A security system for a computer installation making use of streams of surveillance data relating to the behavior of the installation in operation and the actions of the users of said installation, said system comprising:

a set of sensors included in software of the computer installation for indicating actions and events that take place at the level of said software and results of measurements, optionally on demand;

monitors which convert data picked up by the sensors into a stream of surveillance data, said data corresponding to respective actions, events, or measurements; and a facility, coupled to said sensors, for detecting at least one of intrusions and suspect users, in a computer installation, making use of said streams of surveillance data relating to the behavior of the computer installation in operation and to the actions of the users of said installation, said data streams being generated in the installation, the facility comprising:

a first system which models, based on said computer installation and its users and their respective behaviors, a target as a symbolic representation using a semantic network, by making use of previously acquired knowledge and rules;

a second system which compares said target with normal behavior expected for the same conditions as modelled by behavior rules and security rules contained in a knowledge data base of said second system, and which infers therefrom either an anomaly object in the event that at least one of the behavior rules is violated, or an intrusion object or an intrusion hypothesis object in the event that at least one of the security rules is violated;

a third system which interprets the anomaly and intrusion objects by implementing said previously acquired rules and knowledge used by said first system so as to generate, reinforce, or confirm a corresponding intrusion hypotheses;

a fourth system which correlates and compares said intrusion hypotheses and intrusions by implementing said previously acquired rules and knowledge used by said first and third systems in order to associate various intrusion hypotheses and/or intrusions, and to infer new intrusion hypotheses and/or intrusions therefrom;

a communication system which cooperates with the first through fourth systems to provide the various data items that said first through fourth systems produce relating to behavior, anomalies, intrusion hypotheses, and intrusions;

an abstract-investigator which constructs an image representing behavior of said target modeled by said first system and performs investigations in data bases and a fact base of the facility and also in the computer installation;

an analyzer-checker, coupled to said abstract-investigator, which receives image data representing said image from said abstractor-investigator, analyzes said data to interpret behavior of the computer installation and its users with reference to said target to detect anomalies, and outputs anomaly data indicative thereof; and a suspicion and reaction manager, coupled to said analyzer-checker, which analzes said anomaly data, received from said analyzer-checker, to interpret the detected anomalies and intrusions, identify the users actually responsible for anomalies and intrusions, attribute a degree of suspicion to at least one of said users so as to trigger corresponding messages for transmission via a human-machine interface, and optionally trigger restraint measures applicable to the computer installation via said human-machine interface.

10. A security system as claimed in claim 9, further including a set of effectors of a processor or agent type included in said software of the computer installation which implements restraint measures in the computer installation in order to counter attempts at intrusion aimed at said computer installation, said effectors being controlled from a suspicion and reaction manager in said facility via monitors associated with said facility and machines in the computer installation.

11. A facility as claimed in claim 9, further comprising a fifth system which uses said previously acquired knowledge to identify users who are actually responsible for anomalies, intrusion hypotheses, and intrusions as established by the second, third, and/or fourth systems, to evaluate a corresponding degree of suspicion, and to indicate which users are responsible in co-operation with the first through fourth systems and via the communication system.

12. A facility as claimed in claim 9, wherein said first through fourth systems are each are constituted by expert systems that share a common inference engine, operating with forward chaining, said engine being used in association with as many knowledge bases as there are expert systems.

13. A facility as claimed in claim 9, wherein said abstractor-investigator comprises:
- an audit abstractor responsible for creating a time and space image of a state and behavior of said target and interprets on demand data that results from investigation of said state and behavior of said target;
- an audit investigator which searches data in a central audit data base of the facility and acquires surveillance data on demand about the computer installation; and
- a behavior investigator which searches for data for the analyzer-checker and for the suspicion and reaction manager in said data and fact bases of the facility in association with the audit investigator which it controls.

14. A facility as claimed in claim 9, further comprising an analyzer-checker which associates a plurality of modules for analyzing the behavior of said target with a plurality of modules for checking the behavior of said target.

15. A facility as claimed in claim 14, wherein the analyzer modules comprises modules that perform cognitive analysis on the behavior of users, and modules that perform analysis of the operational behavior of the computer installation.

16. A facility as claimed in claim 14, wherein the modules for analyzing behavior comprise a profile checker responsible for checking compliance of behavior as determined by observation with an archived profile, an attack identifier responsible for looking for similarity between determined behavior and known attack scenarios, and two policy checkers, one being a security checker suitable for determining failure to comply with security rules stored in a security policy data base in order to trigger indicating of an intrusion to the suspicion and reaction manager in the event of non-compliance, and the other one being a behavior policy checker suitable for determining non-compliance with behavior rules stored in a behavior policy data base in order to trigger, as appropriate, the indication of an anomaly or of an intrusion to the suspicion and reaction manager.

17. A facility as claimed in claim 9, wherein the suspicion and reaction manager includes a device which interprets the indicated anomalies and intrusions, a device which determines users suspected of being implied in the anomalies, intrusion hypotheses, and intrusions, and also determines a suspicion level which is consequently applied to said suspects, and a device which triggers alarm procedures and prepares restraint measures for access by a person in charge of security via the human-machine interface of the facility.

* * * * *